O. L. HAWK.
POTATO CUTTER AND PLANTER.
APPLICATION FILED MAY 15, 1909.
944,430.
Patented Dec. 28, 1909.
3 SHEETS—SHEET 1.
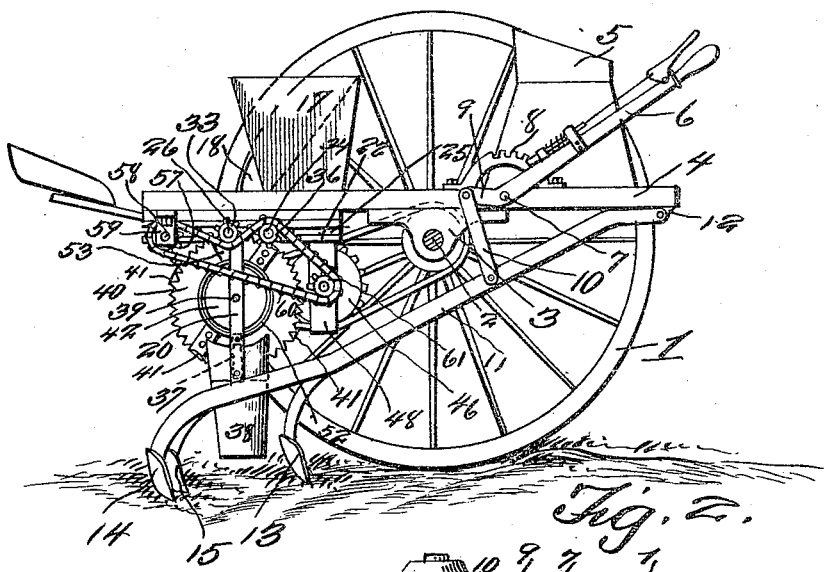
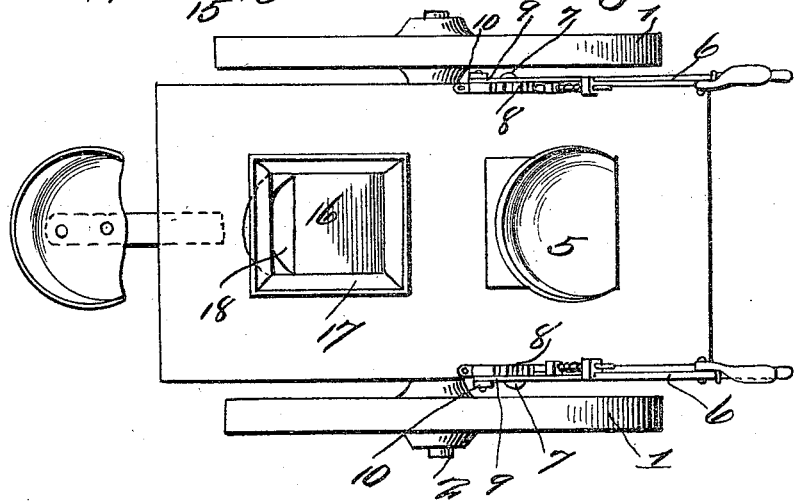
Witnesses
Inventor
O. L. Hawk.
By D. Swift & Co.
Attorneys O. L. HAWK.
POTATO CUTTER AND PLANTER.
APPLICATION FILED MAY 15, 1909.
944,430.
Patented Dec. 28, 1909.
3 SHEETS—SHEET 2.
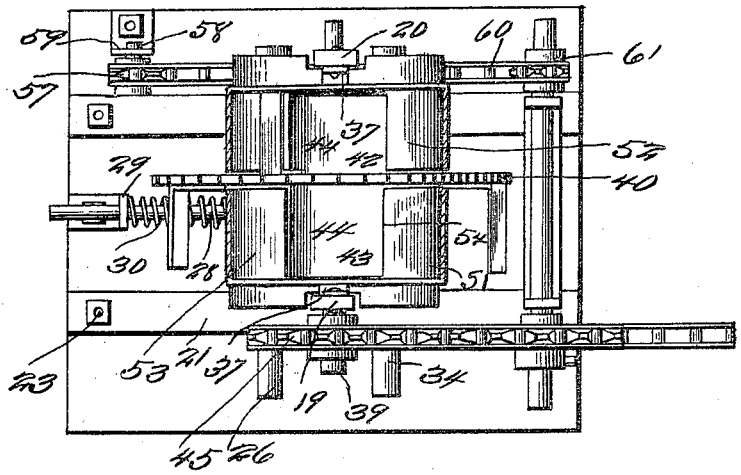
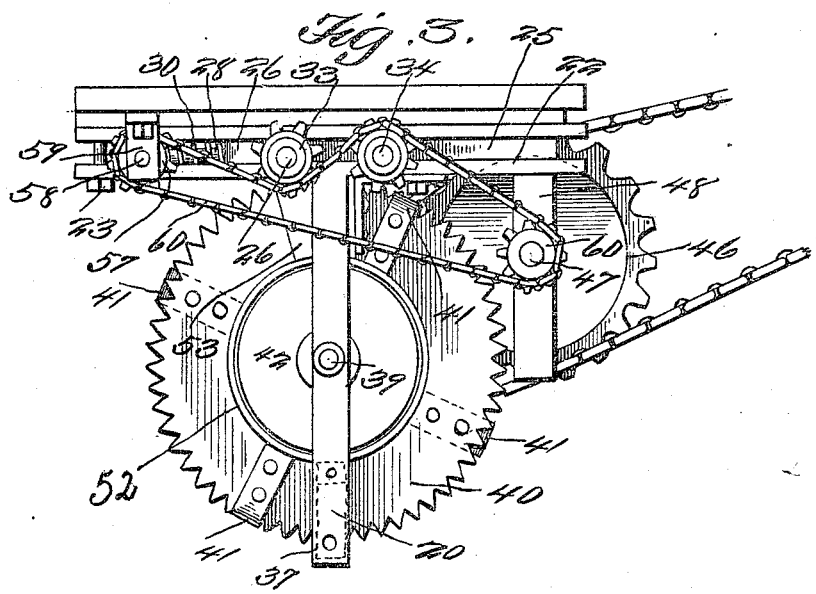
Witnesses
Inventor
O. L. Hawk.
By D. Swift & Co.
Attorneys O. L. HAWK.
POTATO CUTTER AND PLANTER.
APPLICATION FILED MAY 15, 1909.
944,430.
Patented Dec. 28, 1909.
3 SHEETS—SHEET 3.
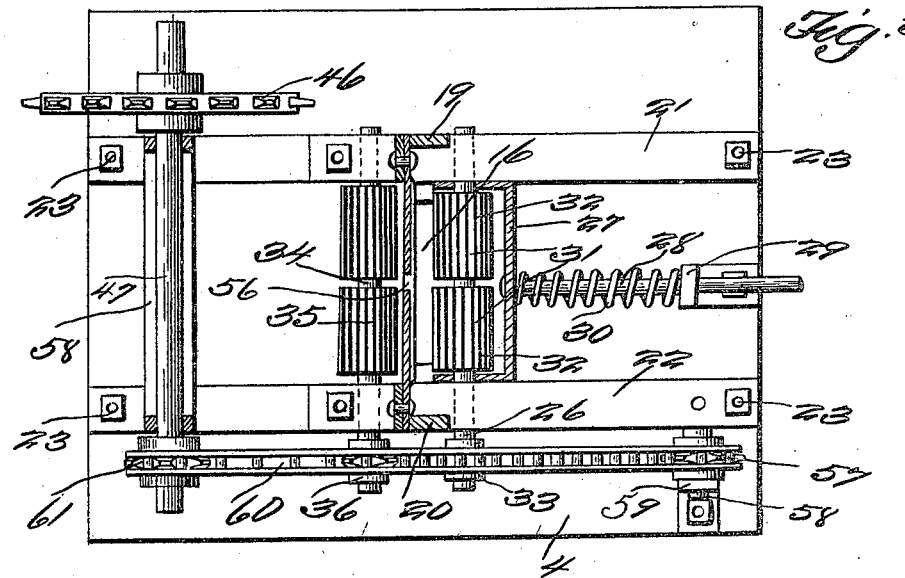
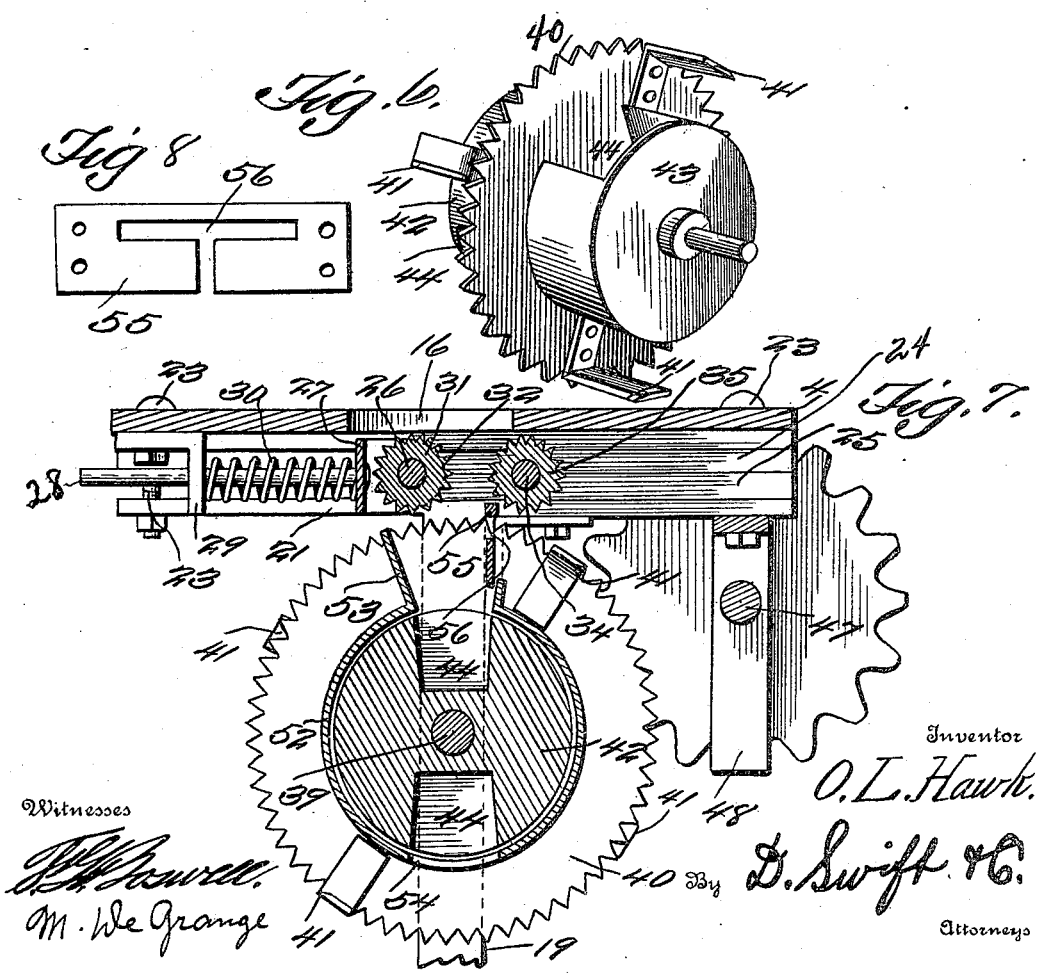

UNITED STATES PATENT OFFICE.

OLIVER LAFAYETTE HAWK, OF YORKTOWN, INDIANA.

POTATO CUTTER AND PLANTER.

944,430.  Specification of Letters Patent.  Patented Dec. 28, 1909.

Application filed May 15, 1909. Serial No. 496,224.

*To all whom it may concern:*

Be it known that I, OLIVER L. HAWK, a citizen of the United States residing at Yorktown, in the county of Delaware and State of Indiana, have invented a new and useful Potato Cutter and Planter; and I do hereby declare the following to be a full, clear, and exact description of the invention, such as will enable others skilled in the art to which it appertains to make and use the same.

This invention relates to improvements in potato planters, and embraces the construction of a planter having improved rotary means for dividing the potatoes for planting purposes.

One of the objects of the invention is the construction of a rotary potato cutter whereby potatoes may be automatically divided and fed to a hopper for planting purposes.

Another object of the invention is the construction of a rotary potato cutter having means for receiving potatoes from a delivering hopper and means for quartering the potatoes preparatory to the planting of the same.

Another object of the invention is the construction of an improved rotary potato cutter embracing feed rollers and a rotary saw having peripheral knives thereon, whereby the potatoes may be divided into seed parts.

With the above and other objects in view, the invention embraces certain combinations, constructions and arrangements of parts clearly illustrated in the following drawings and specification.

In the drawings, Figure 1 is a side elevation of a planter provided with my improved potato cutter. Fig. 2 is a plan view thereof. Fig. 3 is a detail side elevation of the cutter. Fig. 4 is a detail plan view thereof. Fig. 5 is a detail bottom plan view, showing the mounting of the feed rollers and a part of the gearing. Fig. 6 is a detail perspective view of the cutter drum. Fig. 7 is a longitudinal view of a guide plate, and Fig. 8 is a detail plan view of a potato guide.

Referring to the accompanying drawings, which are prepared for illustrative purposes and are accordingly not drawn to scale, 1 denotes supporting wheels which are mounted on the ends of a shaft or axle 2 and which shaft suitably supports, by means of brackets 3, a platform 4.

The platform 4 is provided on its upper side with a seat 5 and a plow operating lever 6 which is pivotally secured at 7 to the platform and is adapted to engage a segmental rack 8 secured on the platform. On the lower end of the lever 6 an arm 9 is fixed, the free end of which has pivotal connection with a depending link 10 which link pivotally connects on its lower end with a plow supporting bar or beam 11. The plow supporting bar 11 is pivotally connected at its upper end with a lug 12, one end of which is pivotally connected to the under side of the platform. The lower end of the plow supporting bar 11 is provided with a furrow opening plow 13, and rearwardly supported covering plows 14 and 15 adapted to cover up the potatoes dropped into the furrow opened by the forward plow 13.

By suitably manipulating the lever 6 the plow supporting bar 11 may be elevated or lowered on the platform 4 so as to bring the plows into engagement with the ground, or hold the same out of engagement with the ground.

The rear end of the platform 4 is formed with an opening 16 through which potatoes may be discharged from the holding hopper 17 located on the platform, forwardly of the opening 16, which hopper is formed on its rear side with a discharge opening 18.

On the under side of the platform 4 a pair of supporting bars 19 and 20 having T-shaped upper ends 21 and 22 are secured by means of bolts 23 thereto. Between the T-shaped heads 21 and 22 of the supporting bars 19 and 20 a pair of spaced bearing blocks 24 and 25 are located on the under side of the platform 4, the rear ends of the bearing blocks 25 being reduced so as to allow for the longitudinal movement of a feed roller shaft 26 thereon. The shaft 26 has mounted thereon a bracket 27 which is provided with an integral rod 28, which rod slidably extends through an aperture bearing bracket 29 located on the rear lower side of the platform 4. The rod 28 is provided with a coil spring 30 whereby the bearing bracket 27 and the feed roller shaft 26 may be normally held apart from the bearing bracket 29. A feed roller 31, having a body portion and provided with longitudinally extending V-shaped teeth 32, is mounted on the shaft 26, which shaft is provided on one end with a gear or sprocket wheel 33. A second feed roller shaft 34 is mounted for rotation on the bearing blocks 24 and 25 and is provided on its body portion with a feed roller 35 similar to the feed roller 31, said shaft being also provided with a gear or sprocket wheel 36.

The lower ends of the supporting bars 19 and 20 are provided with inwardly bent holding plates 37 which are adapted to engage with the funnel head of a conducting tube 38. Intermediate of the ends of the supporting bars 19 and 20 a shaft 39 is rotatably mounted thereon, said shaft being provided on its middle body portion with a cutter saw 40, having peripheral knives 41 extending at spaced points on the opposite sides thereof; each side being provided with a pair of knives. Fixed on the shaft 39 and on the opposite sides of the cutter saw 40 are a pair of drums 42 and 43, each drum being formed with potato receiving pockets 44, located thereon so as to receive potatoes from the cutter knives 41. On one of the outer ends of the shaft 39 a gear wheel 45 is fixed so as to engage with a gear wheel 46 rotatably supported upon a shaft 47 journaled to a depending bracket 48. On the opposite sides of the cutter saw 40 shields 51 and 52 are fixed in place. Each shield being formed on its upper end with a potato guide 53 and formed on its lower end with a discharge opening 54 through which potatoes may pass from the pockets 44 into the conducting tube 38. In order to hold the potatoes in position to be effectively acted on by the cutter saw 40 a guide plate 55 having a T-shaped opening 56 therein is located between the feed rollers 31 and 35, said opening being adapted to receive the upper portion of the cutter saw 40 and the rotating knives 41.

Forwardly of the feed roller shaft 26 a guide sprocket or gear 57 is secured in place by means of a stub shaft 58, one end of which is journaled to a bracket 59 and one end of which is mounted on the rear end of the bearing block 25. A drive chain 60 having connection with a sprocket mounted on the shaft or axle 2 connects the various shafts of the cutter so as to transmit motion from the shaft 2 to the feed rollers and cutter saw. The drive chain 60 is passed over the guide sprocket or gear 57 under the sprocket 33 of the feed roller shaft 26 over the gear or sprocket 36 of the feed roller shaft 34 and over a sprocket or gear 61 mounted on the end of the shaft 47 opposite to the gear 46.

When the planter is driven over the ground the feed rollers 31 and 35 will be rotated and simultaneously with the rotation of the feed rollers the shaft 39 will be rotated so as to cause the knives 41 arranged on the saw 40 and the pockets 44 of the drums 42 and 43 to occupy different positions with respect to the feed rollers. When potatoes are fed from the hopper 17 through the opening 16 of the platform 4, the slidable feed roller 31 will be moved away from the fixed feed roller 35 and as the potatoes fall between the feed rollers the cutter saw 40 will divide them into halves and the cutter knives 41 will divide the halves into quarters. As the potatoes are divided into quarters, they will fall into the pockets of the drums 42 and 43 to be rotated by the shaft 39 to the discharge openings 54 and fall into the conducting tube 38. As the potatoes fall through the opening 16 and between the feed rollers, they will be guided in their movement to the pockets in the drums 42 and 43 by the guide plate 55, and temporarily held after they are divided into halves so as to be severed into quarters by the cutter knives.

My improved machine provides means whereby potatoes may be cut into the proper sizes automatically and released from the platform of the planter frame and by varying the size of the drive gears the speed of the cutter saw and the cutter knives may be also varied, with the result that potatoes of different sizes may be readily handled by the machine.

I claim:—

1. In a device as set forth, a planter platform, bearing blocks mounted on the under face thereof, a fixed feed roller mounted on the blocks, a slidable feed roller mounted on the blocks, a drum having pockets therein and provided with a saw movable therewith, a shield for the drum having an entrance mouth, located below the feed rollers and provided with a discharge opening with which and the mouth the said pockets alternately register, and cutting means movable with the saw.

2. A potato cutter and planter having a platform, a shaft having a rotary saw and provided with drums having pockets, bearings for the shaft, shields for the drums having entrance mouths and discharge openings registrable with the pockets, said platform having an opening in registration with the entrance mouths, and cutters carried by the saw to sever the potatoes as they pass from the said opening of the platform through the entrance mouths.

3. In combination, a planter platform, supporting means on the under side of the platform, a rotary saw mounted on the supporting means, cutting knives fixed on the periphery of the saw and extending at angles thereto, a drum having pockets therein mounted against the saw and movable therewith, a shield for the drum, a hopper supported on the supporting means, and feed rollers for feeding potatoes to the saw.

4. In combination, a planter platform, supporting bars on the under side of the platform, a shaft journaled on the bars, a rotary saw mounted on the shaft, knives mounted on the periphery of the saw and extending at angles thereto, a drum having pockets therein mounted on the shaft against the saw, said pockets being located slightly rearwardly of the knives, a shield for the drum having a potato guide formed on its upper end, and means for operating the saw and knife.

5. In combination, a planter platform, bearing blocks mounted on the under side of the platform, a fixed feed roller mounted on the bearing blocks, a feed roller slidable on the bearing blocks, a bracket, a guide rod mounted in said bracket and provided with an angular frame connected to the slidable roller, a spring interposed between the angular frame and the said bracket and adapted to hold the slidable feed roller adjacent to the fixed feed roller, a rotary drum having pockets oppositely arranged disposed below the feed rollers, a shield therefor having an entrance mouth and discharge opening, and potato cutting means rotatable with the said drum co-acting with the feed rollers.

6. In combination, a planter platform, bearing blocks mounted on the under side of the platform, a fixed feed roller mounted on the bearing blocks, a feed roller slidable on the bearing blocks, a bracket having a guide rod provided with an angular frame connected with the feed roller last mentioned, a spring mounted on the guide rod for holding the slidable roller toward the fixed roller, a rotary drum having pockets oppositely arranged disposed below the feed rollers, a shield therefor having an entrance mouth and discharge opening, and potato cutting means rotatable with the said drum co-acting with the rollers.

7. In combination, a planter platform, bearing blocks mounted on the under side of the platform, a fixed feed roller mounted on the bearing blocks, a feed roller slidable on the bearing blocks, spring means for holding the slidable roller toward the fixed roller, supporting bars mounted on the bearing blocks, a rotary saw mounted on the supporting bars, a plurality of knives fixed on the periphery of the saw and extending at angles thereto, drums having potato pockets therein mounted against the saw to receive potatoes from the cutting knives, a guide located between the feed rollers, shields having potato guides mounted on the drums, a hopper supported on the bars, and means for connecting the feed rollers and the saw.

8. In combination, a planter platform, bearing blocks mounted on the under side of the platform, supporting bars mounted on the bearing blocks, feed rollers located on the bearing blocks, a shaft journaled on the supporting bars, a saw mounted on the shaft, drums having pockets therein mounted on the shaft on opposite sides of the saw, knives mounted on opposite sides of the saw at spaced points on the periphery thereof and at angles thereto and forwardly of the pockets of the drums, and means for gearing the feed roller and the saw.

9. In combination, a planter platform, supporting bars located on the under side of the platform, a shaft journaled on the supporting bars, a saw mounted on the shaft, drums having potato pockets therein mounted on the shaft against the opposite sides of the saw, cutting knives mounted on opposite sides of the saw at angles thereto and forwardly of the drum pockets, shields having discharge openings arranged over the drums, means for driving the saw, and a conducting tube mounted on the lower ends of the supporting bars.

10. In combination, a planter platform, supporting bars mounted on the under side of the platform, a shaft mounted on the supporting bars, a rotary saw having cutter knives extending at angles thereto, potato receiving drums mounted on the shaft against the opposite sides of the saw, shields having potato guides and discharge openings arranged over the drums, a guide having an opening for the knives and for the saw arranged over the saw, a hopper mounted on the lower ends of the supporting bars, a fixed feed roller having V-shaped teeth mounted on the under side of the platform above the saw, a shaft having a feed roller thereon, a bracket mounted on the shaft, a rod mounted on the bracket, a bearing bracket for the rod, a spring for the rod, gears for connecting the feed rollers and the saw, and a chain movable over the gears.

In testimony whereof I have signed my name to this specification in the presence of two subscribing witnesses.

OLIVER LAFAYETTE HAWK.

Witnesses:
SIGEL HANCOCK,
FRANK CRAWFORD.